(12) United States Patent
Chung

(10) Patent No.: US 8,626,595 B2
(45) Date of Patent: Jan. 7, 2014

(54) ONLINE SHOPPING SYSTEM AND METHOD FOR USE OFFLINE, AND APPARATUSES APPLIED TO THE SAME

(75) Inventor: Tae Sung Chung, Seoul (KR)

(73) Assignees: Tae Sung CHUNG, Seoul (KR); ComPePrice LLC.PA (US)

( * ) Notice: Subject to any disclaimer, the term of this patent is extended or adjusted under 35 U.S.C. 154(b) by 130 days.

(21) Appl. No.: 12/208,134

(22) Filed: Sep. 10, 2008

(65) Prior Publication Data
US 2010/0049630 A1 Feb. 25, 2010

(30) Foreign Application Priority Data

Aug. 20, 2008 (KR) .................. 10-2008-0081590

(51) Int. Cl.
*G06Q 30/00* (2012.01)
(52) U.S. Cl.
USPC ........................................ 705/26.1
(58) Field of Classification Search
None
See application file for complete search history.

(56) References Cited

U.S. PATENT DOCUMENTS

| | | | | |
|---|---|---|---|---|
| 6,754,636 B1* | 6/2004 | Walker et al. | ............ | 705/26 |
| 7,213,754 B2* | 5/2007 | Eglen et al. | ............ | 235/383 |
| 7,848,948 B2* | 12/2010 | Perkowski et al. | ............ | 705/14.4 |
| 2006/0149640 A1* | 7/2006 | Gordon et al. | ............ | 705/26 |
| 2007/0288312 A1* | 12/2007 | Wang | ............ | 705/14 |
| 2009/0132366 A1* | 5/2009 | Lam et al. | ............ | 705/14 |

FOREIGN PATENT DOCUMENTS

| | | |
|---|---|---|
| KR | 1020070096275 | 10/2007 |
| KR | 1020080014344 | 2/2008 |

OTHER PUBLICATIONS

"The Future of Virtual Malls" by Hendershott and all., (Spring 2001).*
Korean Office Action for Oct. 2008-0081590, citing the above reference(s).

* cited by examiner

*Primary Examiner* — Luna Champagne
(74) *Attorney, Agent, or Firm* — Lowe Hauptman & Ham, LLP

(57) ABSTRACT

This invention relates to an online shopping system and method for use offline, and apparatuses applied to the same. More particularly, this invention relates to the integration of an online shopping system into offline stores through the conversion of online shopping to offline shopping, using communication networks such as the Internet, to create a new shopping concept based on using the combined advantages of online and offline environments such as that of online price competitiveness and offline customer relationships, while effectively providing users with freedom of detailed product knowledge and product purchases at online prices.

16 Claims, 6 Drawing Sheets

ONLINE SHOPPING SYSTEM AND METHOD FOR USE OFFLINE, AND APPARATUSES APPLIED TO THE SAME

BACKGROUND OF THE INVENTION

1. Technical Field

This invention relates to an online shopping system and method for use offline, and apparatuses applied to the same and, more particularly the conversion of online shopping to offline shopping through a communications network such as the Internet to create a new shopping concept based on using the combined advantages of online and offline environments such as that of online price competitiveness and offline customer relationships.

2. Description of Related Art

As a result of developments in information technology leading to diversified communications methods, offline shopping has transitioned from catalog sales to cable TV shopping and Internet-based online shopping, while the explosive growth of Internet users has marked the trend of extreme growth in online shopping where its foundation lay in electronic commerce systems and wired/wireless communications technologies.

Particularly, online shopping, which provides diversified product information and contents to users, has shown rapid growth by changing the shape of shopping in offline environments.

Generally, in an Internet-based shopping service, the provider of the service often films a video related to a product, then converts it to a file format to be uploaded to a database, and offers the video on the provider's web server for online users to watch.

However, the aforesaid online shopping services can only be provided by the provider, and thus have the disadvantage of limiting users from browsing selected products in more detail, while users can only retrieve information posted by the provider.

As a result of this practice, users tend to prefer offline purchases even despite paying higher prices.

Therefore, a new shopping concept is necessary and crucial at this time in order to satisfy the needs of these users who are the consumers.

SUMMARY OF THE INVENTION

Problem to be Solved

Consequently, this invention relates to solving the aforesaid problems. The objective of this invention relates to the conversion of online shopping to offline shopping through a communications network such as the Internet, more particularly to create a new shopping concept based on using the combined advantages of online and offline environments such as that of online price competitiveness and offline customer relationships by providing the online shopping system and method for use offline, and apparatuses applied to the same.

Solution to Problem

The first aspect of this invention includes various online shopping business components that sell products through online shopping; the Service Management component which provides authorizations to at least one of the various online shopping business components to sell their products in offline stores; and the Service User-Interface component that includes the display terminal for providing product information of authorized online shopping business components as well as the user-interface to accept user orders for the product.

The second aspect of this invention relates to the Service User-Interface component, more particularly the Display component which includes the display terminal showing the product information for the authorized online shopping business components to sell their products at offline stores; the User-Input component to process user purchases for the product; the payment component for processing user payment transactions for the product; and the Order Formation component for the formation of product purchase information by combining the order and transaction information of the purchased product.

The preferred additional feature for the aforesaid Service User-Interface component would be to include a network system for receiving and sending product information.

The third aspect of this invention relates to the method of online shopping in offline stores, and includes receiving product information from various online shopping business components selling said products online by a product information acceptance stage device; granting authorization to at least one of said various online shopping components to sell said products offline, if said received product information satisfies a predetermined business selection criteria, by a business selection stage device; displaying said product information for said products of said authorized online shopping components with said products in offline stores by a product information guide stage device; processing a user order and payments for said products by a product purchase stage device; and creating order forms based on product purchase information which includes said orders and said payments, and sending said order forms to said authorized online shopping business components, by an order completion stage device, wherein when said authorized online shopping components are changed, product information for products of said changed authorized online shopping components is displayed.

The preferred additional feature for the aforesaid method of online shopping in offline stores would be to include a Product Delivery stage for the authorized online shopping business components to deliver directly to the users.

Effectiveness

Consequently, this invention, which is based on the conversion of online shopping which uses a communications network platform such as the Internet to offline shopping, more particularly to create a new shopping concept based on using the combined advantages of online and offline environments such as that of online price competitiveness and offline customer relationships, provides the advantages whereby users can visit offline stores to observe products in detail, while they can also purchase the products at online prices.

Furthermore, this invention creates price competition amongst online shopping business components, and placing the product of the online shopping business with the better price competitiveness provides the advantage to the users of lower prices when purchasing.

DETAILED DESCRIPTION OF THE INVENTION

The desirable functionality of the online shopping system in offline stores will be best understood by reference to the following detailed description of the illustrative embodiment when read in conjunction with the accompanying drawings, wherein:

This invention relates to a new shopping concept based on the realization of online shopping in offline stores in which products from online stores using communications network platforms such as the Internet can be displayed in offline stores, which provides increase in user accessibility to products, while satisfying consumer purchase desires by allowing them to purchase at real-time online prices.

DETAILED DESCRIPTION OF THE PREFERRED EMBODIMENT

FIG. 1 depicts an exemplary organizational chart of the online shopping system in offline stores. As illustrated in FIG. 1 as an example, the online shopping system in offline stores includes at least one or more sellers of products that make up at least one or more Online Shopping Business components 100; the connection to at least one or more Online Shopping Business components 100 through a communications network such as the Internet; Service Management component 200 for the selection of businesses with the selected products to be sold in offline stores after receiving the product information including price, stock quantity and product description from at least one or more Online Shopping Business components 100 under the established business selection criteria; and Service User-Interface component 300 for establishing the selected businesses with authority to sell in offline stores utilizing the given business selection information, and to display the product information on-screen from the selected businesses.

Here, the Service User-Interface component 300 allows for users to place orders for purchases as well as complete their transactions.

Once the Service Management component 200 receives the product purchase information (for example, information including a product order statement, transaction statement, and delivery address), the corresponding order form is sent to the Online Shopping Business components 100 with the relevant products, and thereupon, the Online Shopping Business components 100 use the received order form to deliver the corresponding products to the users.

Furthermore, the Service Management component 200, which provides a service to online businesses to sell in offline stores, is operated by a different business entity; hence, when delivering and paying the transaction amount of the order form to the relevant Online Shopping Business 100, it is preferred to subtract a specific amount of commission from the total amount for providing the offline stores as a service.

More particularly, the Service Management component 200 includes the Product Information Service for delivering the business selection information formed by the selection of at least one Online Shopping Business 100 to sell in offline stores established through the business selection criteria and delivering the business selection information through a network connection to the Service User-Interface component 300 that is placed adjacent to the product in offline stores; and Product Sales, which sends the order forms created upon receiving the product purchase information made by the users through the Service User-Interface component 300 to the relevant Online Shopping Business 100 so that they may directly deliver the product to the users.

The aforementioned business selection criteria could include various standards with regards to the product; however, the preferred method is to establish the lowest price as the standard, as the application of online shopping's advantages in offline stores is the most important. Therefore, the lowest price is the business selection criteria used hereinafter.

Furthermore, the selected business is a sole business with the lowest price, or multiple businesses nearest the lowest price.

When the circumstances call for the selection of multiple businesses, the user can select from the multiple businesses through the display of each product information of the selected multiple businesses on the Service User-Interface component 300 positioned adjacent to the products in the offline stores.

The Product Information Service provides the sales authorization in offline stores for the Online Shopping Business 100 with the lowest price bid as part of the real-time price competition between at least one online shopping business component of a certain product. This sales authorization between at least one Online Shopping Business component 100 in real-time price competition allows the Online Shopping Business components 100 to be changed.

However, too frequent a change in the sales authorization may induce confusion to users, and thus, establishing a time limit or timeframe is preferred.

Furthermore, apart from the change of sales authorizations in respect to price competition between businesses, if the Online Shopping Business 100 with the higher sales authority sells all of the specified products and no longer has it in stock, then the sales authorization is granted to the Online Shopping Business 100 with the next level of authority.

If Product Sales receives the product purchase information with just the order statement from the Service User-Interface component 300, Product Sales stands by until an additional payment for the product has been processed, upon which it then creates the order form and sends it to the Online Shopping Business 100.

Furthermore, online shopping in offline stores does not only refer to selling online shopping products in offline stores, but also the connection to at least one Offline Shopping Business component 400 that sells its products offline. This allows for price competition between products in online shopping versus offline shopping.

FIG. 2 depicts an exemplary illustration of the various types of Service User-Interface components mentioned in FIG. 1. As illustrated in FIG. 2 as an example, the Service User-Interface component 300 can be embodied in various ways in consideration of production costs or user-friendliness.

First, the embodiment of the Service User-Interface component 300 as labeled in a) of FIG. 2 can be wireless and easy to place next to a product, and can be an integrated unit with a display module for providing the user with product information and a card-reader module for transactions of products to the user. Here, the card-reader module is a functionality example, and this can be replaced with different payment methods.

Furthermore, the display module uses a touch-screen in order to provide users with product purchase options or the use of buttons for users to provide users with product purchase options.

Label b) of FIG. 2 has a similar structure to a) with the difference being the detached display module and card-reader module, but while c) also has a detached display module and card-reader module, it uses a wired network connection.

Unlike the aforesaid circumstances, label d) of FIG. 2 has a display module that shows the product information of only the selected business, while the product information of other businesses can be shown or not shown as it is adhered below the product as a memo written on paper material. In addition, it has a detached display module and card-reader module.

Furthermore, label e) of FIG. 2 has a similar structure to d) with the difference being that it is wireless.

FIG. 3 depicts an exemplary flow chart of the processes of the online shopping system in offline stores as mentioned in FIG. 1. As illustrated in FIG. 3 as an example, the online shopping method in offline stores involves receiving product information from at least one Online Shopping Business 100 and selecting the Online Shopping Business 100 with the lowest price bid for granting authorization to sell in offline stores.

Henceforth, the Service Management component 200 delivers the business selection information to the Service User-Interface component 300 which is placed adjacent to the appropriate product inside the offline stores.

Hereupon, the Service User-Interface component 300 uses the received business selection information to display the product information of the selected business on the display screen as a guide to users S108.

Henceforth, users can visit offline stores and use the display screen of the Service User-Interface component 300 to check the product information for the product they wish to purchase, and using the Service User-Interface component 300 to purchase and pay for the product, the Service User-Interface component 300 compiles S110 the product purchase information (for example, information including a product order statement, payment statement and delivery address).

The Service Management component 200 receives the product purchase information from the Service User-Interface component 300 and compiles the order form S112/S114, then sends the compiled order forms to the appropriate Online Shopping Business components 100 to deliver the relevant products to the users who purchased them.

FIG. 4 depicts an exemplary diagram of a process of the online shopping system in offline stores as mentioned in FIG. 1. As illustrated in FIG. 4 as an example, regarding the online shopping method in offline stores, more particularly, the process inside the offline stores while assuming that a cart-card is equipped for a user purchasing online products in an offline store, involves providing cart-cards to the visiting user S200/S202.

Henceforth, the user with the cart-card may order a camera during the process of shopping in the offline store, in which time the user can have the card-reader module positioned next to the camera read the cart-card to form the first order statement S204/S206. This first order statement will be recorded onto the user's cart-card.

Furthermore, if the user wishes to add a mobile phone to the cart, the user can then have the card-reader module next to the mobile phone read the cart-card to form the second order statement S210/S212, and the second order statement will be recorded onto the cart-card.

Lastly, if the user wishes to add a portable MP3 player, the user can have the card-reader module next to the MP3 player read the cart-card to form a third order statement S214/S216, and the third order statement will be recorded onto the cart-card.

Henceforth, the user can return the cart-card to the checkout to transmit the order statement S218 when done shopping. The user can input the delivery address or cancel any of the items in the order statement during the aforementioned S218 process.

In addition, when the cart-card is not returned to the checkout counter (for example, if the user took the cart-card out of the offline store), the information pertaining to the cart-card gets deleted after a certain timeframe, and the orders created with the statements by using the cart-card are automatically cancelled, giving other users the opportunity to buy those products.

Furthermore, the cart-card can be returned to the staff at the checkout counter, or the user can confirm the order by having the cart-card read using a touch-screen or button-input type monitor next to the checkout counter, whereby the user can then return the cart-card to the card return box.

Afterwards, the user can make the payment for the purchased products S220, then the product purchase information which includes the payment statement is sent to the Service Management component 200, which in turn is reported to the appropriate Online Shopping Business 100, allowing the delivery of the relevant products to the user.

FIG. 5 depicts an exemplary diagram of an additional process of the online shopping system in offline stores mentioned in FIG. 1. As illustrated in FIG. 5 as an example, regarding the online shopping method in offline stores, more particularly, the process inside the offline stores while assuming that a membership card (for example, a card that also has payment functions) has been issued to the user purchasing online products in an offline store, involves the user being able to shop at the offline store with the membership card S300/S302.

If the user wishes to order a camera while shopping, the user can have the card-reader module that is positioned adjacent to the camera read the membership card to create the first order statement S304/S306. The first order statement is stored in the database in response to the user membership card's unique identification number.

During this process, when the membership card is read by the card-reader module, the display screen shows a message asking whether the user is willing to pay for the product now with the membership card, and the user can have the option of making the payment now or to create the first order statement to pay for it at a later time.

Furthermore, if the user wishes to order a mobile phone, the user can have the card-reader module that is positioned adjacent to the mobile phone read the membership card to create a second order statement S308/S310, and the second statement will be stored in the database as mentioned above.

Again, when the membership card is read by the card-reader module, the display screen shows a message asking whether the user is willing to pay for the product now with the membership card, and the user can have the option of making the payment now or to create the second order statement to pay for it at a later time.

Lastly, if the user wishes to order a portable MP3 player, the user can have the card-reader module that is positioned adjacent to the MP3 player read the membership card to create a third order statement S312/S314, and after checking the message regarding paying for the product now S312/S314, if the user decides to pay for it at a later time and only add to the third order statement, the user can then go to the checkout counter and use the membership card to make the payment S316/S318.

In the aforesaid S314 stage, if the user decides to pay for the purchases with the purchase of the MP3 player, the payment for the MP3 player is completed at S320. Even though the transaction is complete, the user can visit the checkout counter and enter additional information such as the shipping address for the MP3 player to be delivered.

Afterwards, the product purchase information which includes the payment statement is sent to Service Management component 200, which is in turn reported to the appropriate Online Shopping Business 100, allowing the delivery of the relevant products to the user.

FIG. 6 depicts an exemplary diagram of an additional process of the online shopping system in offline stores as mentioned in FIG. 1. As illustrated in FIG. 6 as an example, regarding the online shopping method in offline stores, more particularly, the process inside the offline stores while assuming that the user purchasing online products in an offline store holds a credit card, involves the user being able to shop at the offline store with the credit card S400/S402.

If the user wishes to order a camera while shopping, the user can have the card-reader module that is positioned adjacent to the camera read the membership card to create the first order statement S404/S406. The first order statement is stored in the database in response to the user's credit card number.

During this process, when the membership card is read by the card-reader module, the display screen shows a message asking whether the user is willing to pay for the product now with the credit card, and the user can have the option of making the payment now or to create the first order statement to pay for it at a later time.

Furthermore, if the user wishes to order a portable MP3 player, the user can have the card-reader module that is positioned adjacent to the MP3 player read the credit card to create a second order statement, and after checking the message regarding paying for the product now S408/S410, if the user decides to pay for it at a later time and only add the second order statement, the user can then go to the checkout counter and use the membership card to make the payment S412/S414.

In the aforesaid S410 stage, if the user decides to pay for the purchases with the purchase of the MP3 player, the payment for the MP3 player is completed at S416. Even though the transaction is complete, the user can visit the checkout counter and enter additional information such as the shipping address for the MP3 player to be delivered.

Afterwards, the product purchase information which includes the payment statement is sent to Service Management component 200, which is in turn reported to the appropriate Online Shopping Business 100, allowing the delivery of the relevant products to the user.

The above describes this invention's preferred functional examples, but the business using this invention with ample experience in this field of technology may modify or change it, as long as the modifications or changes are confined within the perimeter and scope of this invention as noted in the claims below.

Market Potential

This invention, which relates to the offline usage of online shopping based on communications networks such as the Internet, by which it creates a new shopping concept by combining the advantages of online and offline shopping such as price competitiveness in online shopping and customer accessibility in offline shopping, and therefore, the realistic functionality or marketability of this invention is sufficient and clear, thus, this invention has the necessary market potential.

DESCRIPTION OF THE ELEMENTS OF THE DRAWINGS

Figure 1:
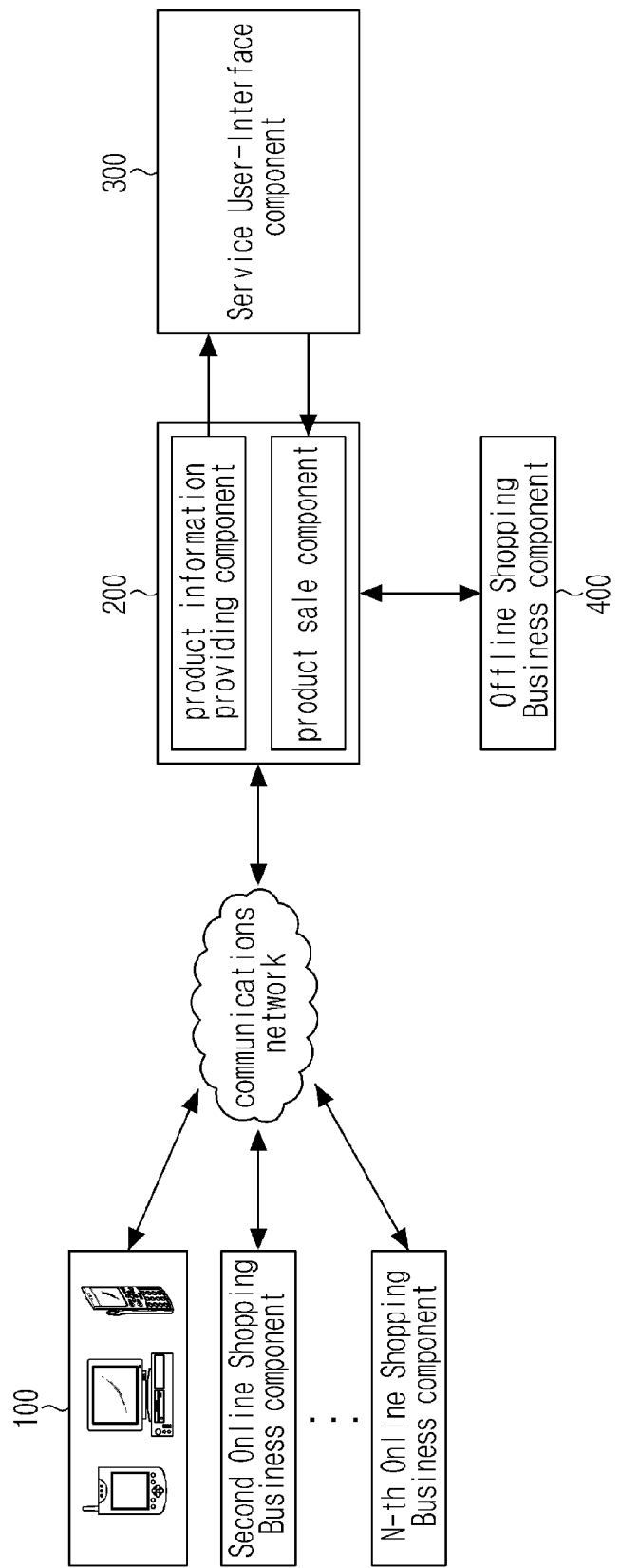
FIG. 1 depicts an exemplary organizational chart of the online shopping system in offline stores.
Figure 2:
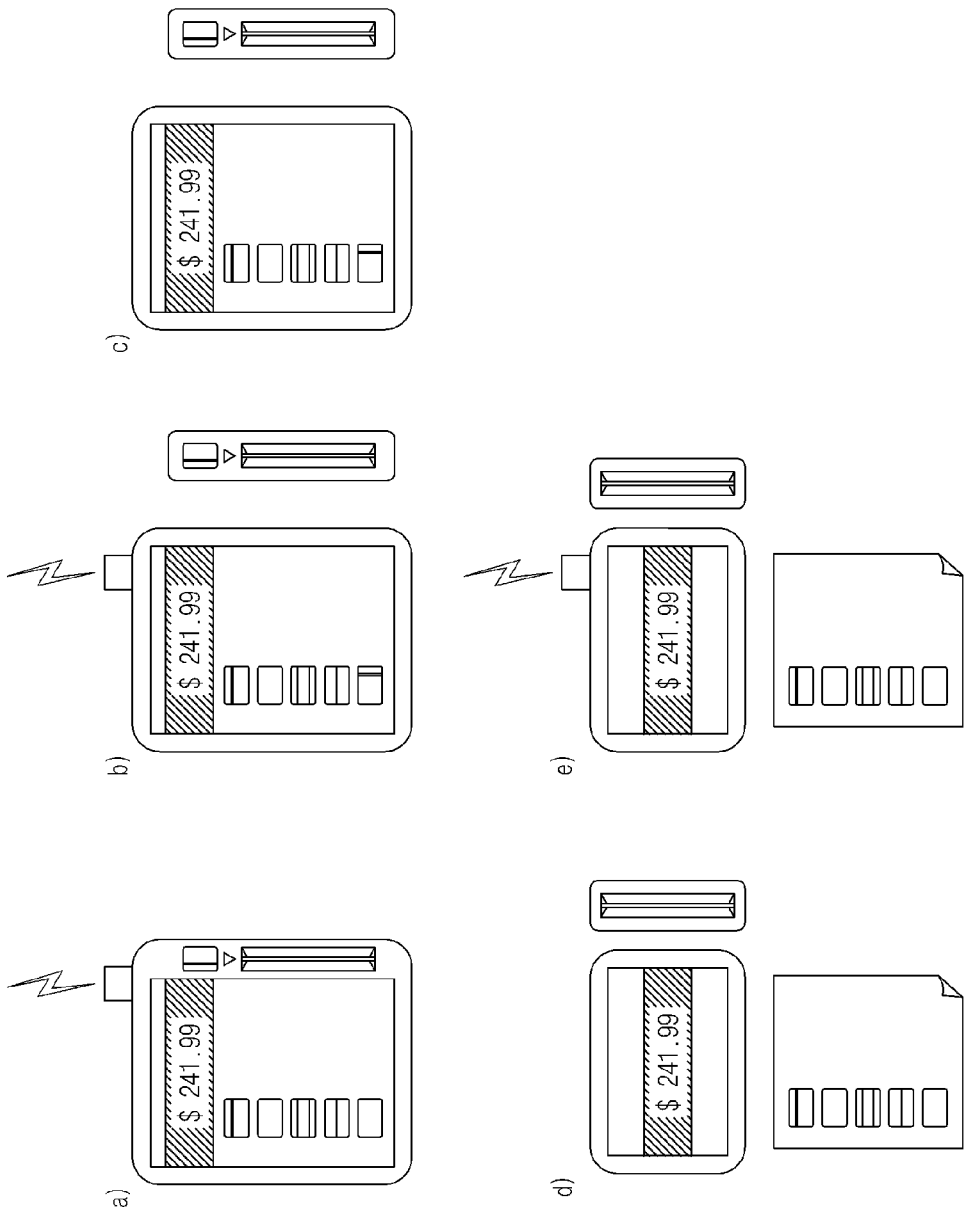
FIG. 2 depicts an exemplary illustration of the various types of Service User-Interface components mentioned in FIG. 1.
Figure 3:
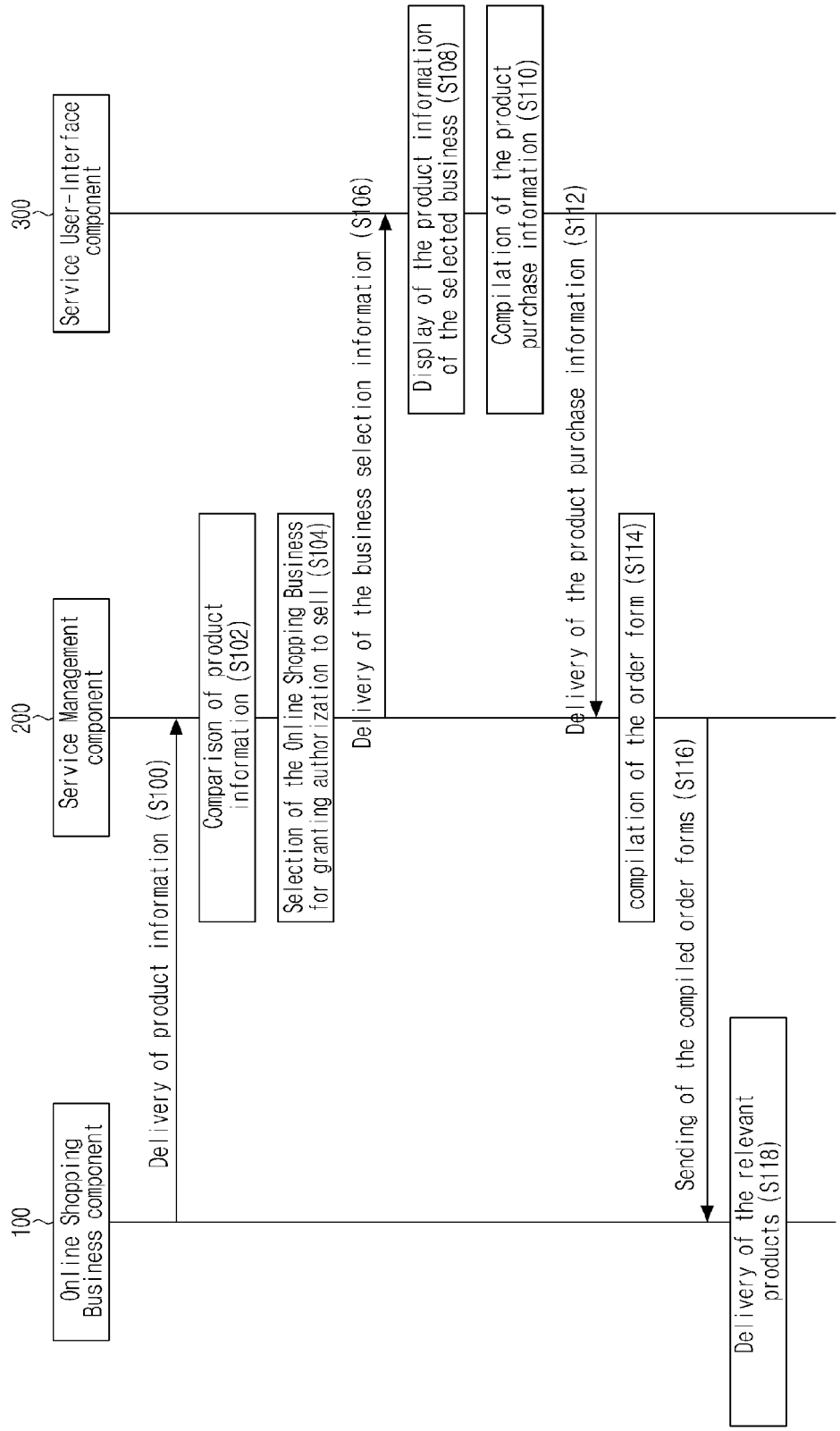
FIG. 3 depicts an exemplary flow chart of the processes of the online shopping system in offline stores as mentioned in FIG. 1.
Figure 4:
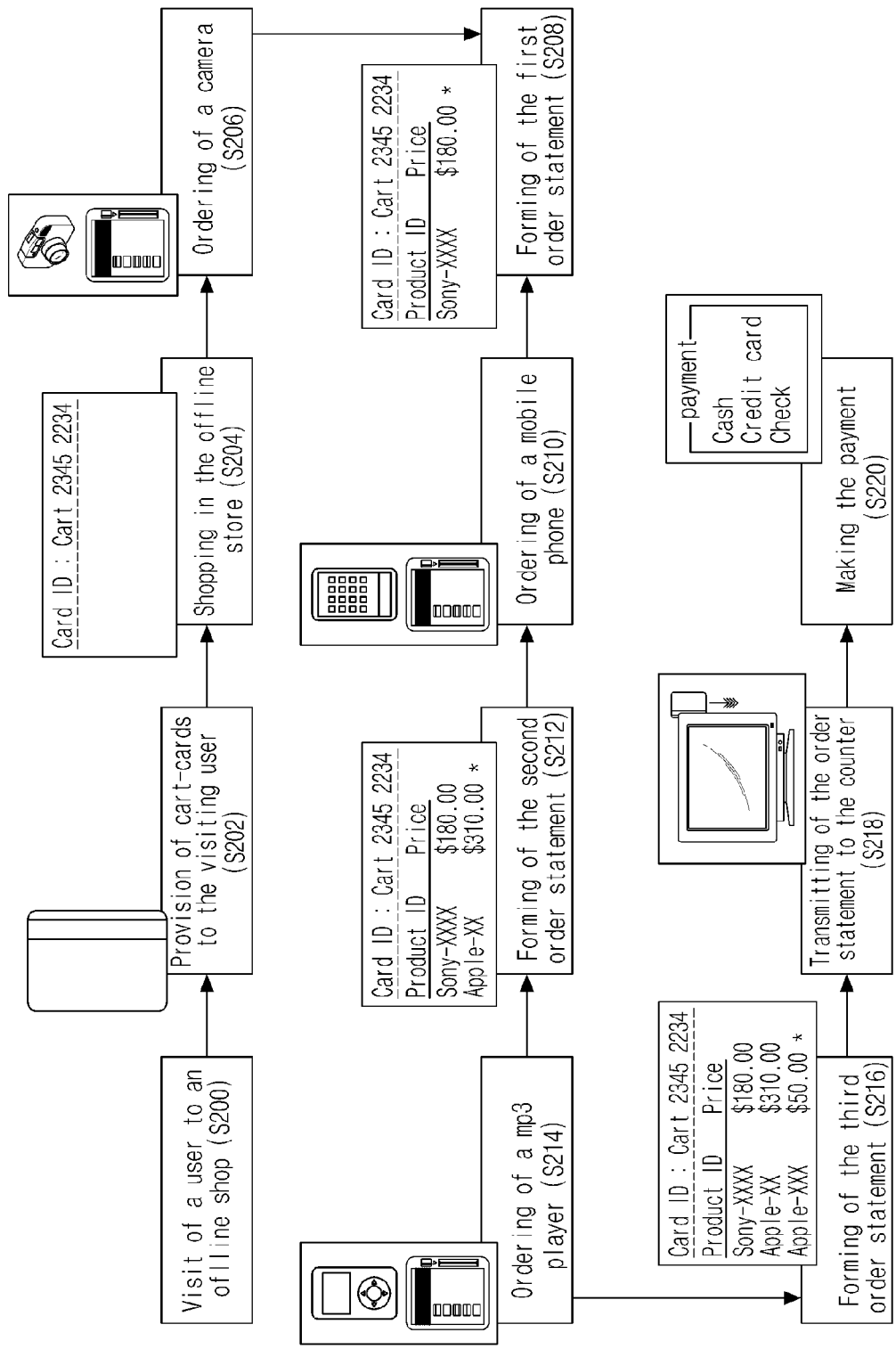
FIG. 4 depicts an exemplary diagram of a process of the online shopping system in offline stores as mentioned in FIG. 1.
Figure 5:
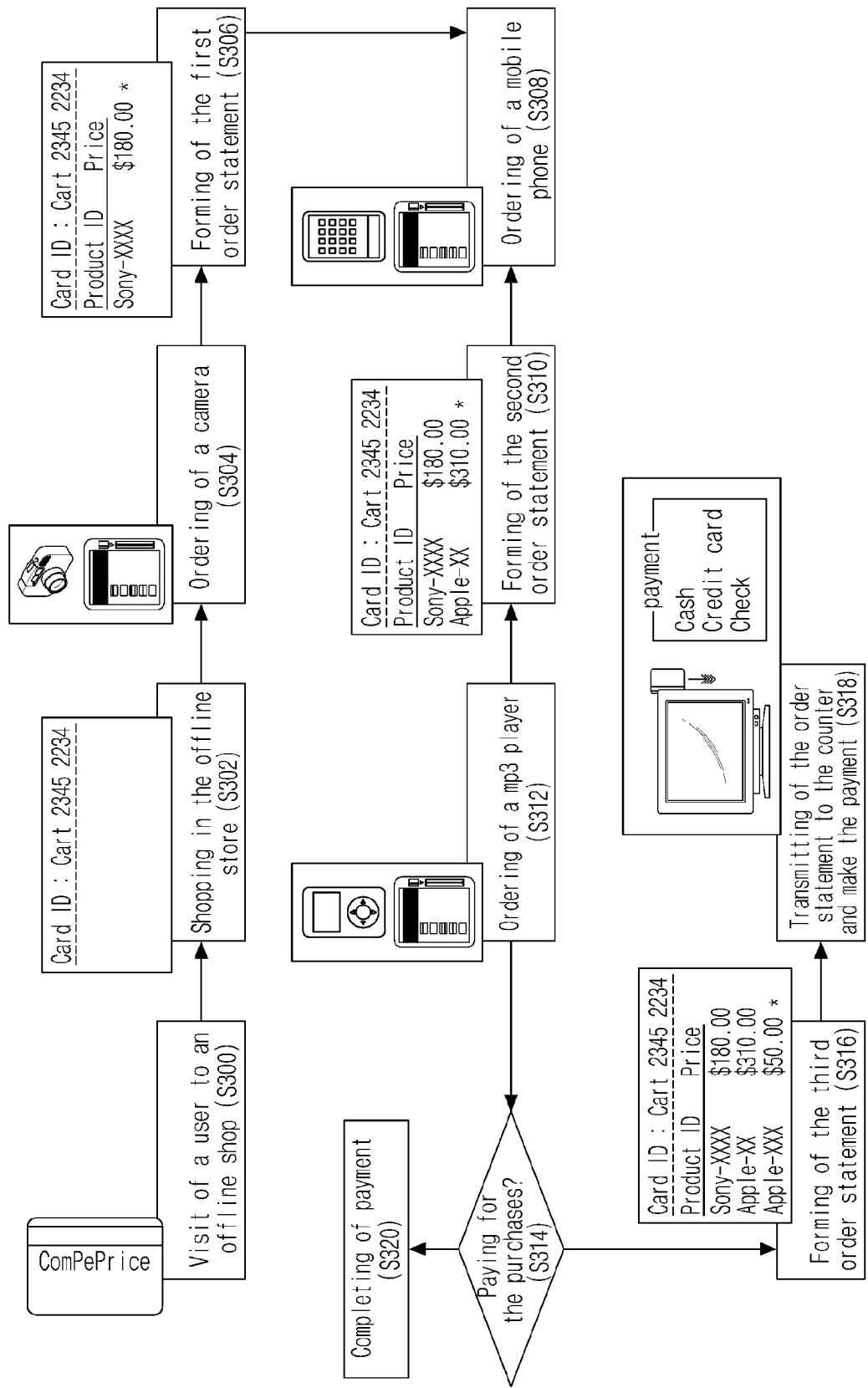
FIG. 5 depicts an exemplary diagram of an additional process of the online shopping system in offline stores mentioned in FIG. 1.
Figure 6:
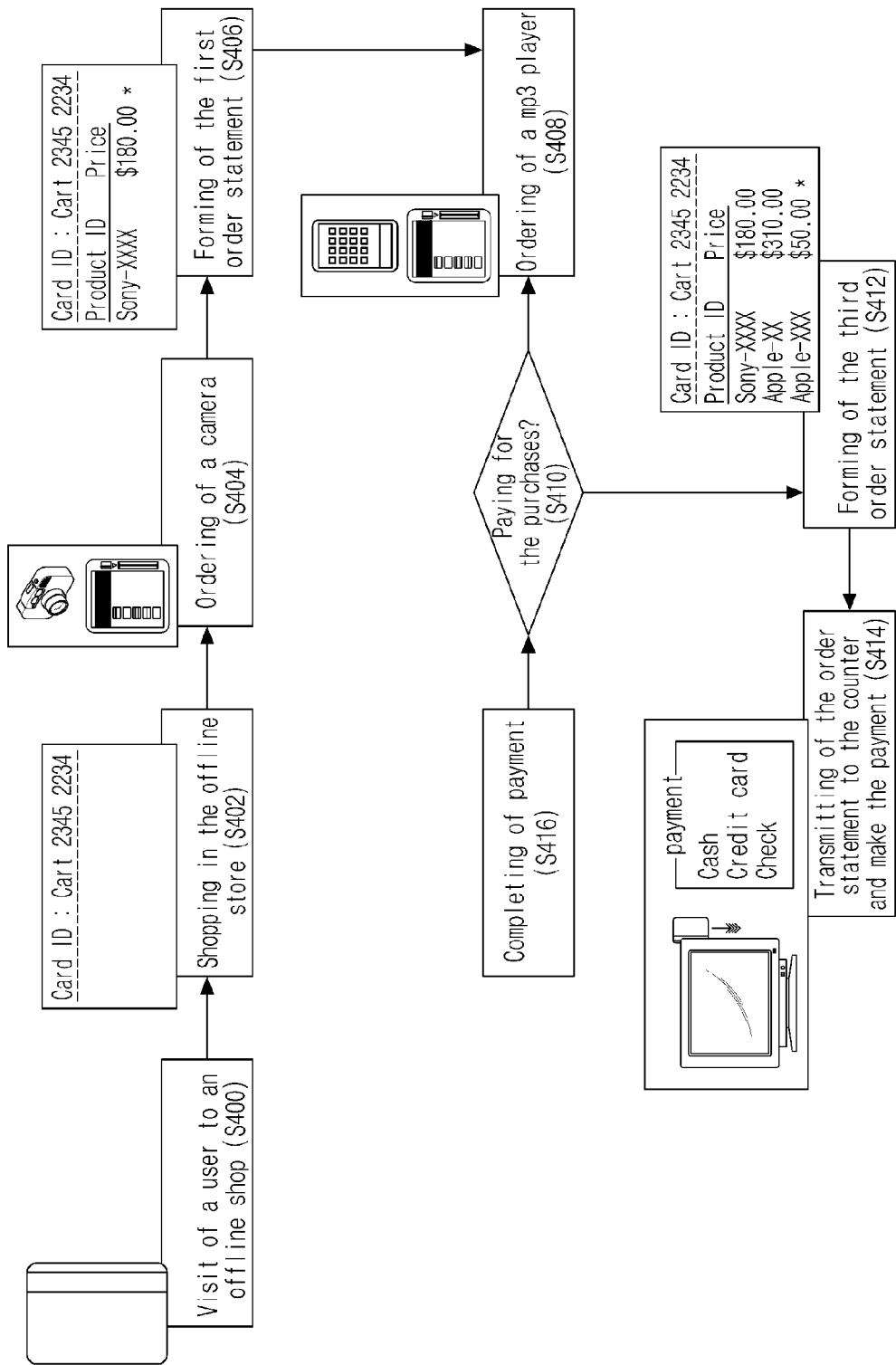
FIG. 6 depicts an exemplary diagram of an additional process of the online shopping system in offline stores as mentioned in FIG. 1.

100: Online Shopping Business
200: Service Management
300: Service User-Interface
400: Offline Shopping Business

What is claimed is:

1. A system for online shopping in offline stores, the system comprising:
   (a) a service management component configured to grant authorization to at least one of various online shopping business components selling products online to sell said products offline, if product information for said products satisfies a predetermined business selection criteria; and
   (b) a service user-interface component configured to display said product information for said products of said authorized online shopping business components on a display terminal and configured to retrieve user orders for said products,
   wherein when said authorized online shopping business components are changed, said service user-interface component displays product information for products of said changed authorized online shopping business components on the display terminal and retrieves user orders for products of said changed authorized online shopping business components.

2. The system of claim 1, wherein said service management component includes a product information provider component configured to receive said product information from said various online shopping business components through communication linkage thereby establishing said authorized online shopping business components based on said business selection criteria and sending said business selection information to said service user-interface component.

3. The system of claim 2, wherein said service management component further includes a product sales component configured to receive product purchase information from said service user-interface component based on said user orders thereby creating an order form, and sending said order form to said authorized online shopping business components.

4. The system of claim 2, wherein said product information provider component is further configured to grant authorization in real-time or in a predetermined timeframe.

5. The system of claim 2, wherein said product information provider component is further configured to establish a single or multiple authorized online shopping business components.

6. The system of claim 5, wherein if multiple said authorized online shopping business components are established, thereby said service user-interface component is further configured to allow selection by users any single business.

7. The system of claim 2, wherein said product information provider component is further configured to allow selection of said business selection criteria including at least one of lowest price and stock for said products.

8. The system of claim 7, wherein if said authorized online shopping business components have no stock available of said products, thereby said product information provider component is further configured to grant authorization to said online shopping business components next in rank based on said business selection criteria.

9. The system of claim 1, wherein said service management component is further configured to grant authorization to at least one of said various online shopping business components or to grant said authorization to at least one of the offline shopping business components that sell said products through offline methods.

10. A system for a service user-interface component, whereby online shopping business components that sell products online are authorized based on a predetermined business selection criteria to sell said products offline, said system comprising:
   (a) a display component configured to display product information for said products of said authorized online shopping business components on a display terminal;
   (b) a user-input component configured to process user purchase options for said products;
   (c) a payment component configured to process payments for said products based on said purchase options; and
   (d) a statement formation component configured to create product purchase information compiled with an order statement and payment statement from said purchase options and said payments respectively,
   wherein said system for the service user-interface component is operated offline, and
   wherein when said authorized online shopping business components are changed, said display component displays product information for products of said changed authorized online shopping business components.

11. The system of claim 10, wherein said user-interface component is further configured to receive said product information through a network connection and to send said product information through the network connection.

12. The system of claim 10, wherein said user-interface component further includes a button-input or touch-input with said display component.

13. A method for online shopping in offline stores comprising:
   receiving product information from various online shopping business components selling said products online;
   granting authorization to at least one of said various online shopping components to sell said products offline, if said received product information satisfies a predetermined business selection criteria, by a service management component;
   displaying said product information for said products of said authorized online shopping components with said products in offline stores by a service user-interface component;
   processing a user order and payments for said products by the service user-interface component; and
   creating order forms based on product purchase information which includes said orders and said payments, and sending said order forms to said authorized online shopping business components, by the service management component,
   wherein when said authorized online shopping components are changed, product information for products of said changed authorized online shopping components is displayed.

14. The method of claim 13, further comprising delivering said products to users.

15. The method of claim 13, wherein said granting authorization further includes:
   receiving said product information of said products through said network connection from said various online shopping business components; and
   selecting said authorized online shopping business components after comparing said product information based on said predetermined business selection criteria.

16. The method of claim 15, wherein said granting authorization further includes:
   granting said authorization in real-time or predetermined timeframe; and
   including the lowest price and total stock of said products for said business selection criteria.

* * * * *